(12) United States Patent
Cato et al.

(10) Patent No.: US 8,504,841 B1
(45) Date of Patent: *Aug. 6, 2013

(54) SYSTEMS AND METHODS FOR SOFTWARE APPLICATION SECURITY MANAGEMENT

(75) Inventors: David Cato, Helotes, TX (US); Tammy Sanclemente, Helotes, TX (US)

(73) Assignee: United Services Automobile Association (USAA), San Antonio, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 13/283,180

(22) Filed: Oct. 27, 2011

Related U.S. Application Data

(63) Continuation of application No. 11/760,714, filed on Jun. 8, 2007, now Pat. No. 8,055,904, which is a continuation-in-part of application No. 11/584,138, filed on Oct. 19, 2006, now abandoned.

(51) Int. Cl.
*G06F 21/00* (2006.01)

(52) U.S. Cl.
USPC .................. 713/183; 713/184; 726/6; 726/28

(58) Field of Classification Search
USPC .................................. 713/183, 184; 726/6, 28
See application file for complete search history.

(56) References Cited

U.S. PATENT DOCUMENTS

| | | |
|---|---|---|
| 5,606,663 A | 2/1997 | Kadooka |
| 5,719,941 A | 2/1998 | Swift et al. |
| 5,734,718 A | 3/1998 | Prafullchandra |
| 6,834,112 B1 | 12/2004 | Brickell |
| 6,957,229 B1 | 10/2005 | Dyor |
| 7,103,912 B2 | 9/2006 | Xia et al. |
| 8,055,904 B1 * | 11/2011 | Cato et al. ............ 713/183 |
| 2004/0190722 A1 | 9/2004 | Grobman |
| 2005/0060572 A1 | 3/2005 | Kung et al. |
| 2005/0097320 A1 | 5/2005 | Golan et al. |
| 2005/0182969 A1 | 8/2005 | Ginter et al. |

OTHER PUBLICATIONS

Password Management Best Practices, Obtained from http://psynch.com/docs/password-management-best-practices.pdf, M-Tech Information Technology, Inc. Calagary, Canada, (2004), 16 pgs.
Microsoft Solutions for Security and Compliance: Password Management, Microsoft Identity and Access Management Series, Microsoft Corporation, (2006), 75 pgs.
Site Security Handbook, Fraser, B., (ed), Network Working Group, Request for Comments: 2196, (Sep. 1997), 75 pgs.
Barrett, R., et al., "Field Studies of Computer System Administrators: Analysis of System Management Tools and Practices", Proceedings of ACM CSW '04, Chicago, IL, (Nov. 6-10, 2004), 8 pgs.
Sandhu, R., et al. "Authentication, Access Control, and Audit", ACM Computing Surveys, 28, (Mar. 1996), pp. 241-243.

* cited by examiner

*Primary Examiner* — Eleni Shiferaw
*Assistant Examiner* — Paul Callahan
(74) *Attorney, Agent, or Firm* — Brooks, Cameron & Huebsch, PLLC

(57) ABSTRACT

Apparatus and method for managing password information associated with a service account are disclosed. In some embodiments, a service account management system is configured to include a security account utility and a password information data store. In some embodiments, a security account utility is used when registering, tracking, and adjusting password change information. In some embodiments, notification of a password change date is transmitted to a service account owner and a security auditor for enforcement. Use of a security account management system with a middleware application is also disclosed.

20 Claims, 7 Drawing Sheets

SYSTEMS AND METHODS FOR SOFTWARE APPLICATION SECURITY MANAGEMENT

RELATED APPLICATIONS

This application is a Continuation of U.S. patent application Ser. No. 11/760,714, filed on Jun. 8, 2007, now U.S. Pat. No. 8,055,904, which is a Continuation-In-Part of U.S. patent application Ser. No. 11/584,138, filed on Oct. 19, 2006, now abandoned, which is herein incorporated by reference.

This application is related to U.S. patent application Ser. No. 11/760,718, filed on Jun. 8, 2007; now abandoned, and to pending U.S. patent application Ser. No. 11/584,773, filed on Oct. 19, 2006.

TECHNICAL FIELD

Embodiments disclosed herein relate, generally, to systems and methods that manage software application security, and more particularly, to systems and methods that manage the authentication credentials used by software applications.

BACKGROUND

As a company grows in size and complexity, and its customer base increases, and/or expands its customer offerings, more devices may be needed to store and process the information needed to service those customers. These devices may be networked across many rooms in a single building, across multiple buildings on a corporate campus, or across multiple locations separated by hundreds of miles communicating only through commodity Internet connections. Moreover, the complexity of networked systems can increase dramatically as the number of devices interconnected to facilitate the exchange of information also increases. Managing the flow of information can be a daunting task, even with a computer.

SUMMARY

Methods of exchanging information between systems and methods of processing information on a system generally require launching a software application (or software process). Software processes may run on a machine in the foreground or the background. Generally, access credentials are required to launch a software process. The credentials may include an identifier and password information used by the process for authentication.

There are presently two password types, a user password and a process password. When a user leaves a company or no longer has a need for access to run software or generate data, user password information can be removed to block the user from gaining further access. However, one or more software applications accessed by the user may remain operational. If the user has knowledge of a process password, a mechanism for gaining unauthorized access to the process exists. Moreover, operating systems such as Windows™, Linux™, Unix™, AIX™, and MAC™ generally include, or are configured to accept, a default configuration from launched processes. Default configurations for the more common operating systems, in general, are often well-known to those skilled in the art of system software. Knowledge of a default configuration can further open the system to hacking and hijacking.

A service account is software code containing the credentials required by an associated software application. Credentials include an application identifier and a password for application authentication. Access credentials can be embedded within, or appended to, the software application code. Consequently, a service account can be used to provide access to a software process in the foreground and background of a machine, independent of the user's employment status.

A default configured service account, for example, will typically retain a default password that can be used to gain access to a destination process or system and data accessible therein. Each instance of a service account on each machine may have a different default password. Because the password information for a service account may only exist on the machine on which it resides, depending on the number of service accounts and the number of machines, tens of thousands of service account default passwords can exist. Therefore, the inventors have recognized the need to properly manage service accounts for the various operating systems and the associated password processes because such accounts can represent a large security risk to an organization.

In an embodiment, an apparatus for security management includes a machine with a service account module configured to include access information, including a password for launching process code. The apparatus also includes a security account management system configured to associate the service account module with an adjustable timestamp. The security account management system includes a service account utility configured to include service account application code to communicate with the service account module and to register a password change date for the first process code. The apparatus also includes a security record data store configured to retain a security record including an identifier associated with the service account module and the password change date.

In another embodiment, a method of managing service account security includes requesting registration of password information associated with a service account. The password information includes a service account identifier and a user identifier. The method also includes assessing a security level for the service account. The security level is based on a combination of a security risk level and an operational risk level. The risk levels are associated with a service account function and the data to be accessed. The method also includes generating a password maintenance schedule based on the security level. The method also includes registering the password information in association with the maintenance schedule and enforcing the password maintenance schedule.

In another embodiment, a machine readable medium having machine-executable instructions is used to perform the above method of managing service account security.

BRIEF DESCRIPTION OF DRAWINGS

Embodiments are illustrated by way of example and not limitation in the figures of the accompanying drawings, in which like references indicate similar elements.

DETAILED DESCRIPTION

Figure 1:
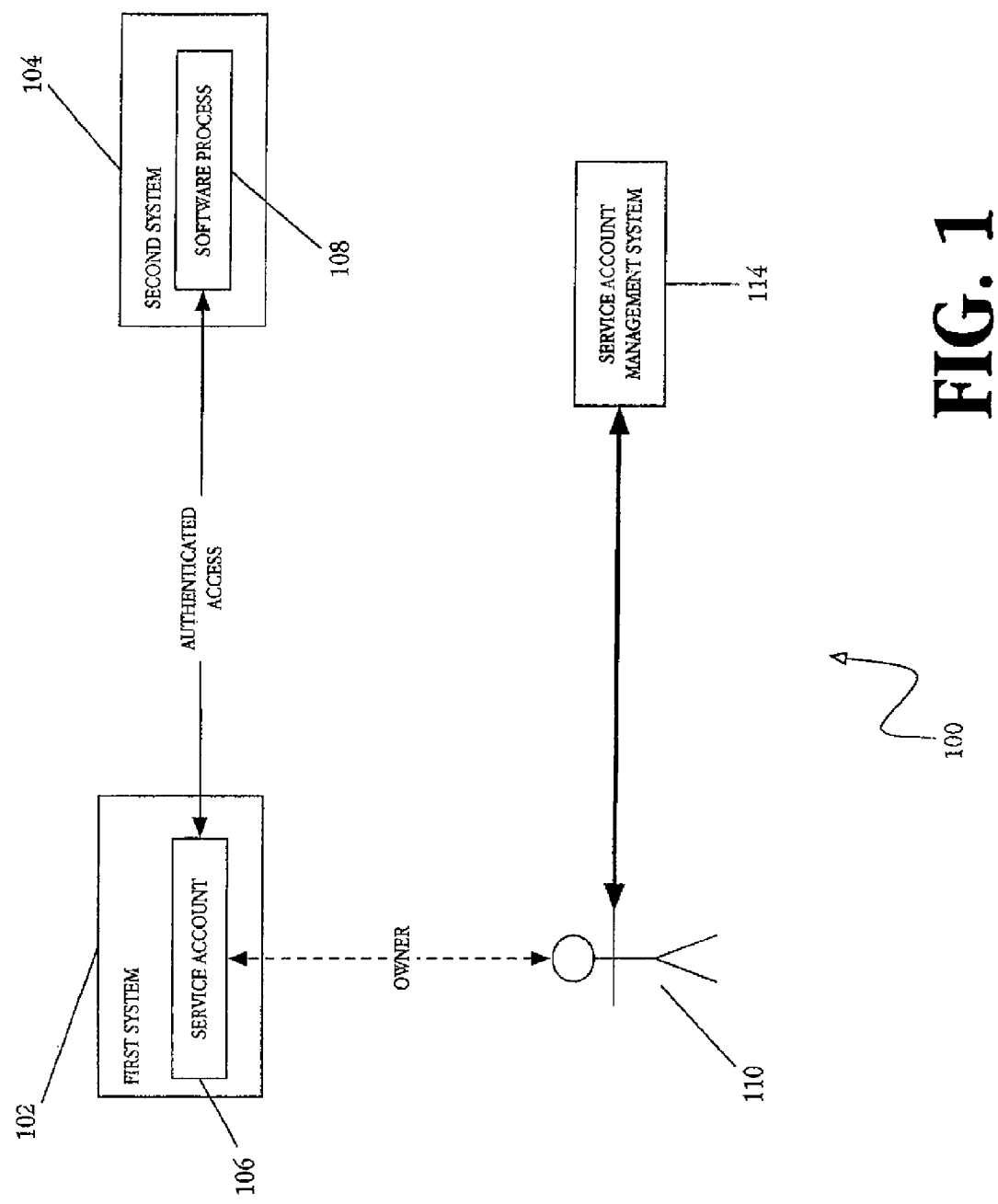
FIG. 1 is a high-level block diagram illustrating a service account security management system, in accordance with an example embodiment.

The following detailed description is divided into four sections. Titles are provided for the convenience of the reader and are not intended to limit the scope of the subject matter described anywhere herein. The first section presents an overview of embodiments of the inventive subject matter with reference to a system for software application security management. The second section presents example systems according to various embodiments. The third section provides example methods of using embodiments of the inventive subject matter.

The fourth section describes an example implementations of the inventive subject matter.

Overview

A user account can be distinguished from a service account in that the user account is identified with a specified user, whereas a service account is identified with a software process that can be launched by one or more users. A managed service account resident on one machine typically uses a middleware application to perform some process on another machine. A middleware application, such as WebSphere™, is a software application providing connectivity between like and disparate operating systems running on various computers located on a network. A service account identifier is used to authenticate a launched process to the middleware application, which then passes the process to the destination machine. In contrast, a non-managed service account can directly accesses a destination system or process without a middleware application. Embodiments of the invention described herein relate to the maintenance of the health and well-being of both managed and non-managed service accounts.

As used herein, "password" includes passphrases and refers, generally, to secret authentication data used to control access to a resource, as are commonly known with respect to authentication. "Module" refers to a software, hardware and firmware components, as is known to one of ordinary skill in the art, and includes executable code and instructions and/or circuitry as necessary to perform an intended function. "Machine" refers, generally, to any device or system capable of using a machine-readable medium, such as a read-only memory (ROM), a random access memory (RAM), a magnetic disk storage media, an optical storage media, a flash memory device, media including a barcode, media including ink, a punch card, paper tape, and the like. Example machines include, without limit, a computer, a personal digital assistant, a cell phone, a printer, and a scanner. The term "user" refers to "human entity" and a "proxy", such as a proxy server operating under human identity. A user may be an owner or manager of the service account. The owner has primary responsibility for monitoring the security records of one or more service accounts. The manager has oversight responsibility for one or more service accounts. The manager may be an executive level employee having responsibility for one or more other managers, who in turn have oversight responsibility for one or more owners. The owner, manager, and executive are considered a user within the context of the present discussion.

FIG. 1 is a high-level block diagram illustrating a service account security management system, in accordance with an example embodiment. The system 100 includes a first system 102 and a second system 104 coupled across a network, and a service account management system 114. The network can be the Internet, an intranet or a data bus. In some embodiments, system 102 and system 104 are computer systems. In some embodiment, system 102 and system 104 are formed as one computer system. The first system 102 includes a service account 106 and the second system 104 includes a software process 108. Service account 106 contains the access credential required by process 108. In some embodiments, service account 106 includes password information for authenticated access to, and communication with, software process 108. Service account 106, in some examples, provides access information to software process 108, to cause software process 108 to perform some function, such as the transmission of transactions processed by system 104 during the last 24 hours. Here, user 112 has responsibility for the operation of service account 106, including the management of any password used for authenticated access to software process 108.

In an embodiment, software process 108 is configured to issue instructions to one or more computer systems, to cause one or more computer systems to perform an intended function. One example is the execution of an overnight batch process that retrieves daily transaction logs from one or more data stores. Using the system illustrated in FIG. 1 as an example, the first system 102 assembles credit card accounting data for a credit card issuing institution, such as the bank issuing the cards. During the day, the second system 104 uses process 108 to processes credit card authorizations from merchants and stores the data related to the transactions. During an overnight time period, the bank can retrieve the transactions using system 102 and post the transactions to individual user accounts. To initiate retrieval, the first system 102 requests the daily transaction log from the second system 104. However, what is being stored in the transaction log is financial data that, if disclosed, can result in fraudulent activity. To ensure that only authorized service accounts are able to retrieve such information, the second system 104 may require a password before allowing the data to be retrieved or sent. Here service account 106 provides credentials to process 108 for retrieving and transmitting a transaction log. In one example, service account 106 contains encrypted credentials for authenticated access. Service account 106 supplies password credentials to the second computer system 108, which when authenticated, launches software process 104. Using software process 108, the transaction log can then be sent to the first system 102 for further processing. Use of a credit card transaction is merely meant to be illustrative and not limiting. Any interaction between computer systems that requires password authentication for initiating a process is considered within the scope of the present discussion.

Service account management system 114 provides user 110 with the ability to update service account security records with respect to the service accounts that the user is allowed to access. The service account management system 114 interacts with service account 106 through a service account utility, as described below. Service account security records are data records that contain at least password maintenance date information for a service account and identification of the service account user and owner. User identification can include, without limitation, the user's name and contact information, a service account process identifier that can serve as a key to retrieve user and owner information from a second data store, an identifier that can serve as a key to retrieve user and owner information from a third data store, and the like. The service account security record does not need to maintain direct identification of the user and owner if the identifier serves as a key, but rather the security record can provide information for directing other machines to retrieve user and owner contact information.

In a further embodiment, the service account security record includes a security risk level and an operational risk level associated with service account 106. Security risk level can be used to limit access to the data generated by process 108 for a given service account 106. The security risk level can be adjusted to account for a privacy concern and to establish a degree of protection to be afforded. Examples of security level includes, without limitation, internal use only, confidential information, restricted information, and general information. A security level can also be based on the characteristics of an operating system residing on system 102 and 104. Operational risk level can be used to represent the "Availability" impact of the service account, for example, as high, medium or low.

In some embodiments, service account management system 114 stores the individual password records in a single service account security record containing all associated security records of a user or an owner. Here, a single service account record includes multiple security records managed by the service account management system 114, uniquely referenced by the process being performed or by a process identifier.

Example Systems

Figure 2:
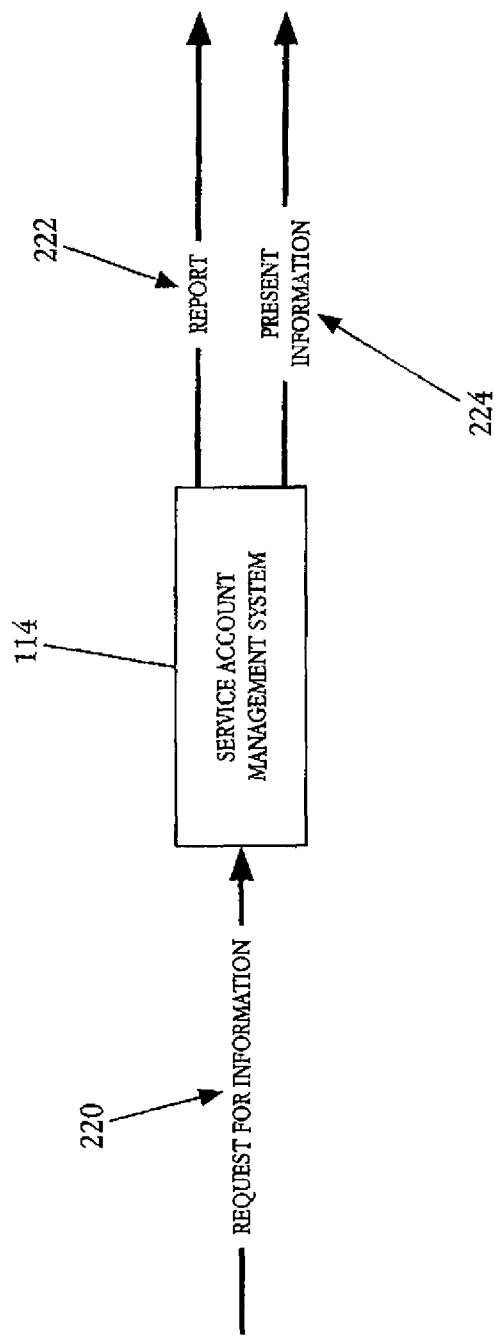
FIG. 2 is a high-level block diagram illustrating an apparatus for providing software application security management, in accordance with an example embodiment.

FIG. 2 is a high-level block diagram illustrating an apparatus for providing software application security management, in accordance with an example embodiment. In an embodiment, the service account management system 114 receives a request for information 220 from a user as an input. The service account management system 114 outputs either a report 222 or present information 224 regarding a service account, or both. The report 222 can be delivered to a user interface for display on a computer device operated by the user, and it can also be delivered in any suitable electronic message periodically sent to the user. In either case, the report is sent to the user so that future actions can be performed as appropriate. The present information 224 can also be sent from the service account management system 114 to other computer systems for further processing, or displayed to the user. In some embodiments, the request for information 220 received from the user is transmitted across a network from a computing device operated by the user. The service account management system is further configured to accept updated password related information from a user through a service account application running on a service account utility. The updated password related information can be inserted into the security account record for future use.

Figure 3:
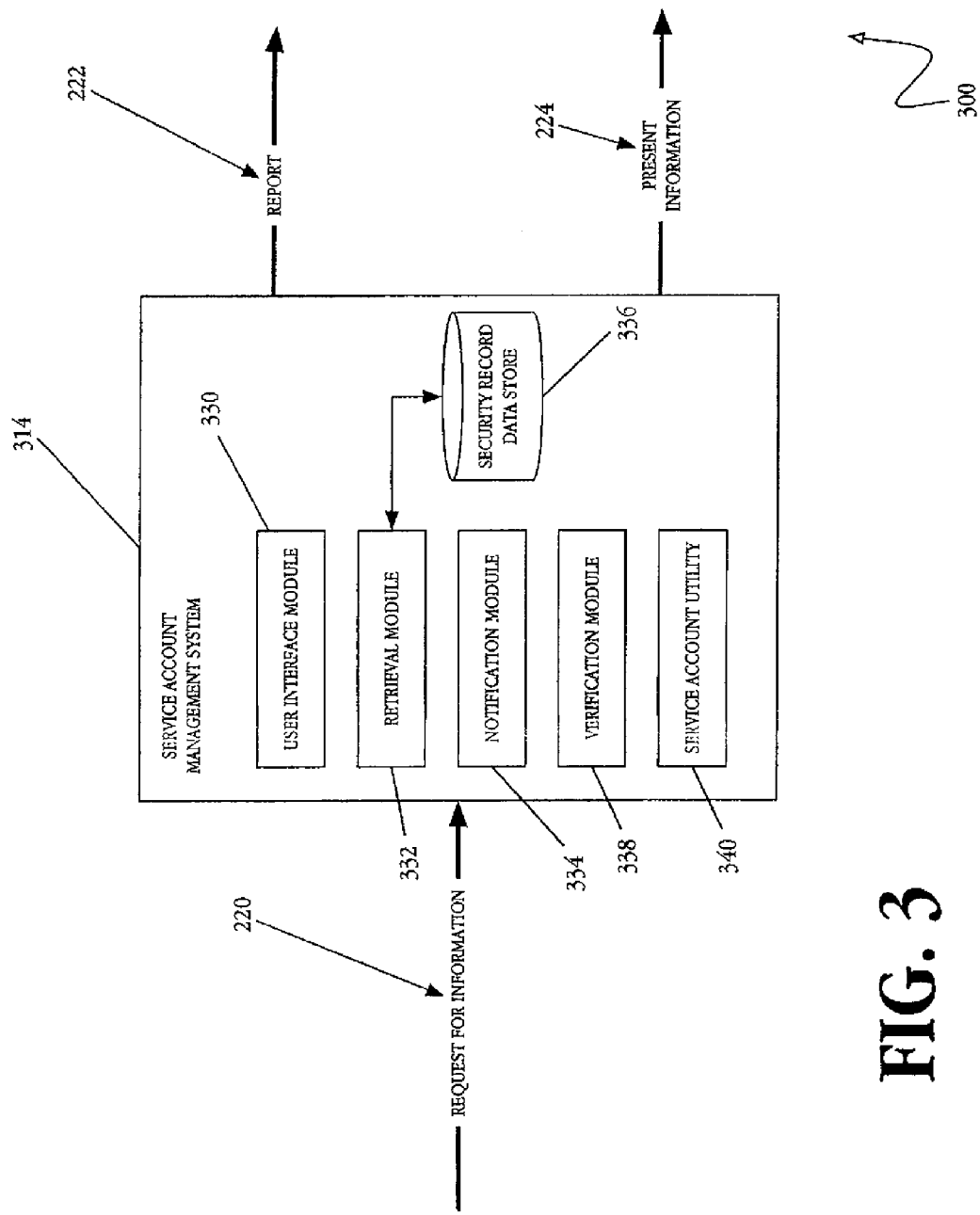
FIG. 3 is a block diagram illustrating a service account management system, in accordance with an example embodiment.

FIG. 3 is a block diagram illustrating a service account management system 300, in accordance with an example embodiment. Here, service account management system 300 includes service account management system 314 containing user interface module 330, retrieval module 332, notification module 334, verification module 338, and service account utility 340. In some embodiments, retrieval module 332 is coupled to a service account security record data store 336. In some embodiments, service account security record data store 336 includes one or more service account security records, as described above. In some embodiments, data store 336 and retrieval module 332 are formed as one software module. In some embodiments, the service account management system 300 includes a verification module for verifying information. In some embodiments, system 300 is a service account management system, such as system 114, as described above and illustrated in FIGS. 1 and 2.

In an embodiment, user interface module 330 is configured to generate a interface through which one or more service account security records are selected for use and display. User interface module 330 can be configured to receive a request for information 220 from a user and display a report 222 and present information 224. Present information 224 and the report 222 can include data related to more than one service account security record. The report 222 can be displayed electronically to the user or output to a printer for later viewing. User interface module 330 can also by used to provide updated information for one or more service accounts for transfer to security record data store 336 for use by the service account management system 314.

Retrieval module 332 can be configured to retrieve service account security records for one or more service accounts. In some embodiments, retrieval module 332 is coupled to user interface module 330 to receive instructions from a user directing the retrieval of information contained in data store 336. In some embodiments, retrieval module 332 is configured to assist in managing service account security record data store 336. Accordingly, retrieval module 332 retrieves the service account security record requested through user interface module 330, which optionally can be passed through user interface module 330 for display to the user.

Notification module 334 can be configured to receive data from retrieval module 332 by receipt of instruction. In some embodiments, notification module 334 is configured to periodically check service account security records for updated information and compliance with a security policy. For example, the security policy for a particular service account may require that the password be changed every 90 days. Notification module 334, in this example, would request the status of a particular security record based on the required password change date. In some embodiments, notification module 334 is configured to retrieve a service account security record and to verify that a service account security record has been updated and, if not, to send a message to the owner of the service account associated with the security record requesting update. The notification module 334 may also be configured to send instructions to retrieval module 332 that cause retrieval module 332 to send to notification module 334 an identifier of any security record that requires updating within a future time period (such as, the next week, next month, etc). Through such functionality, notification module 334 can initiate transmission of an electronic message to the owner of the service account that the security record requires updating. The security policy, in one example, may include a combination of a security risk level and an operational risk level, such as is described above. The security risk level and operational risk level can be used to generate a security policy that can then be enforced by notification module 334. In some embodiments, a request for information 220 is denied or allowed based on the security policy using the notification module 334.

Verification module 338 can be used to verify information related to a user, owner and security auditor. In some embodiments, verification module 338 is used to verify password information. Verification module 338 can be configured to receive a generated hash of a password hash from a password repository. The generated hash can be stored internal to the verification module or in a security record in a data store, such as store 336, for processing information related to an associated service account.

Service account utility 340 can be configured as a password change scheduler with an ability to track changes to password information. A user requesting information from the service account management system 314 may choose to provide updated information, such as a notice of a change in service account password. In some embodiments, service account utility 340 contains a service account application that operates as a interface between a service account, such as account 106, and the service account utility 340. Password related information can be input to service account management system 300 though the service account application. In some embodiments, the service account application is the only means by which a service account communicates with service account utility 340. Service account utility 340 is configured to accept the password change information for a corresponding service account or software application for registration in a security record contained in data store 336. Here, however, the password itself is not retained in data store 336.

As described above, service account management system 314 does not receive an updated password from a user nor does it update passwords for service accounts. The primary function of service account management system 314 here is to manage security records for service accounts, such as account 106, as described above and illustrated in FIG. 1. Since service account management system 314 does not contain service account passwords, the likelihood that such passwords can be obtained from system 314 is eliminated. In some embodiments, service account management system 314 can be configured to receive a service account password from a user. Here again, the password received is not retained within the service account management system 314, but is merely passed to another system for storage.

In some embodiments, when a service account is registered the corresponding account identifier and password are passed to the service account utility 340 for publication within the utility. Here, the service account application does not retain the password. In some embodiments the service account utility 340 is configured to store passwords for at least some of the service accounts managed by the system.

In some embodiments, data store 336 and retrieval module 332 are formed as one software module. In some embodiments, two or more of interface module 330, retrieval module 332, notification module 334, verification module 338, data store 336 and service account utility 340 are formed as one software module.

A service account may be a managed or non-managed service account. For a non-managed service account, the password is stored on the system hosting the service account or within the service account itself. For a non-managed service account, the service account credentials are stored in a manner similar to user accounts. Here, the password is typically stored as hard coded data residing on the machine hosting the service account and the destination machine with the software process to be accessed. The information about the state of a password of a respective non-managed service account can be retrieved using any suitable method, such as querying a host system for password change date. For a managed service account, access to a second host system for purposes of executing a process is through a middleware application. A first computer system can communicate with a second computer system without knowledge of data structures resident on the second computer system using the middleware application. A service account on one computer accessing launches a process on a second computer communicates through the middleware application. This includes communicating a required authentication credential. For example, a service account residing on a computing device provides authentication credentials, such as an account identifier and a password to a middleware host platform. The middleware application residing on the middleware host verifies the credentials before access is granted to a destination system or process. A separate instance of an application executed within the middleware application is initiated for each managed service account. The service account manager 314 can be configured to operate on password related information in a manner essentially independent of the middleware application.

Example Methods

Figure 4:
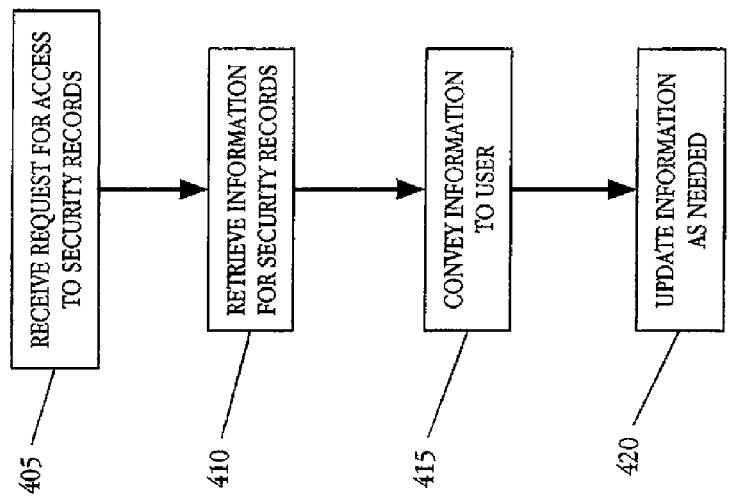
FIG. 4 is flowcharts illustrating a method of accessing and maintaining software application security settings, in accordance with an example embodiment.

FIG. 4 is a flowchart illustrating a method of accessing and maintaining software application security settings, in accordance with an example embodiment. The method illustrated in FIG. 4 may be performed by a service account management system, such as system 314, as described above and illustrated in FIG. 3.

At block 405 a request for access to one or more service account security records is received by a service account management system from a user. The one or more service account security records are associated with at least one service account owned or managed by the user. In some embodiments, the one or more service account security records are associated with at least one new service account being registered. In some embodiments, a service account application running on a service account utility coupled to the service account management system is used to update the service account security records. A service account security record contains at least information for a password change date or password maintenance date, and an identifier sufficient to identify the user. In some embodiments, a service account security record contains only user identifiers sufficient to retrieve user information from a second source. The service account security record can include information for establishing a required periodicity for changing a password. For example, a password used by a service account to access a secure system may be required to change every 90 days. The service account security record, in addition to the date the password was last changed, can contain the password change date interval information. Additional information regarding the service account may be contained within the service account security record, such as an identifier unique to the service account, one or more systems in which the service account is resident, a process the service account is associated with, service account version information, and the like.

At block 410, information from the service account security record is retrieved. This may be some or all of the information contained within the service account security record. If only some of the information is retrieved at block 410, additional information may be requested to comply with further user requests. In some embodiments, information related to at least the password change date and identification of the service account associated with that password change date is retrieved at block 410.

At block 415, the information retrieved at block 410 is conveyed to the user. Depending on the mechanism through which data is requested, the retrieved information may be displayed graphically, such as through the use of a web browser or a client application. Here, user interface module 330 transmits instructions to the device operated by the user to cause the information to be display graphically. The data may also be requested through an automated process, such as a script, in which case, the information may be conveyed to the user through any suitable means, such as an email message alert, a text message alert, a pop-up window displayed when the user next logs onto the service account management system. For a computing device using a web browser, the user interface module 330 transmits a suitable mark-up language formatted document, such as hyper-text markup language (HTML) or extensible markup language (XML) using a suitable protocol, such as hyper-text transfer protocol (HTTP), to the computing device. The computing device receives the document and displays the document for viewing by the user. In an embodiment, the information conveyed to the user performed is through use of an automated report generated by an automated process. The automated report can be generated periodically by a routine executed by a service account management system, such as system 314. Such a routine can, for example, be executed nightly and identify any service account security records where the password has not been changed within the prior month. Here, the password change information can be provided through by a report sent to the owner or manager of the service account where the password has not changed in the month prior. The user or owner can request only the status of the various service accounts having responsibility or ownership over. The user or the owner of a service account can specify time criteria to be used by the service account manager for identifying unchanged passwords.

At block 420, updated information from a user is received by the service account management system. Using the service account application resident in the service account utility, the updated password information is stored in a security account record. In some embodiments, the security account record is stored in the security account utility. In some embodiments, the security account record is stored in a data store coupled to the security account utility. Where updating is not required and notification is therefore not provided, the user or owner can access the service account management system to note whether a password has been changed for that particular service account. The user or owner of a service account can also access the service account management system to query when the next password update will be solicited. In some embodiment, the service account utility is used to calculate the next password change date.

In some embodiments, the service account management system is configured to provide notification to the user or owner of a service account that a password for a specified service account was recently changed. The service account manager can send a confirmation message of a password change to other responsible personnel, such as a security auditor. A message to a security auditor can be sent periodically according to a desired schedule. Similarly, service accounts requiring a password change within a specified time period can also be transmitted to a security auditor. Reporting can be used by the security auditor to address problems and increase the efficiency by which the overall security of service accounts are managed. The above examples are meant to be illustrative and are not intended to be exclusive or exhaustive as it will be recognized that the frequency and number of reports and queries regarding password updating may be adjusted as desired to monitor the health and well-being of a service account.

In some embodiments, the password change information is verified prior to, or subsequent to, the method illustrated in FIG. 4. An example of a prior verification includes instances where the service account management system requests a password change date from a host system for the purposes of verifying the information contained within the service account security record, or to identify which service accounts are pending a password change. An example of a subsequent verification includes instances where the user is requested to change the password and the service account management system verifies the password change. The service account management system can be configured such that the password change date information stored therein cannot be altered of record by a user. As such, the password change date information is able to serve as a data point for password change audits.

Figure 5:
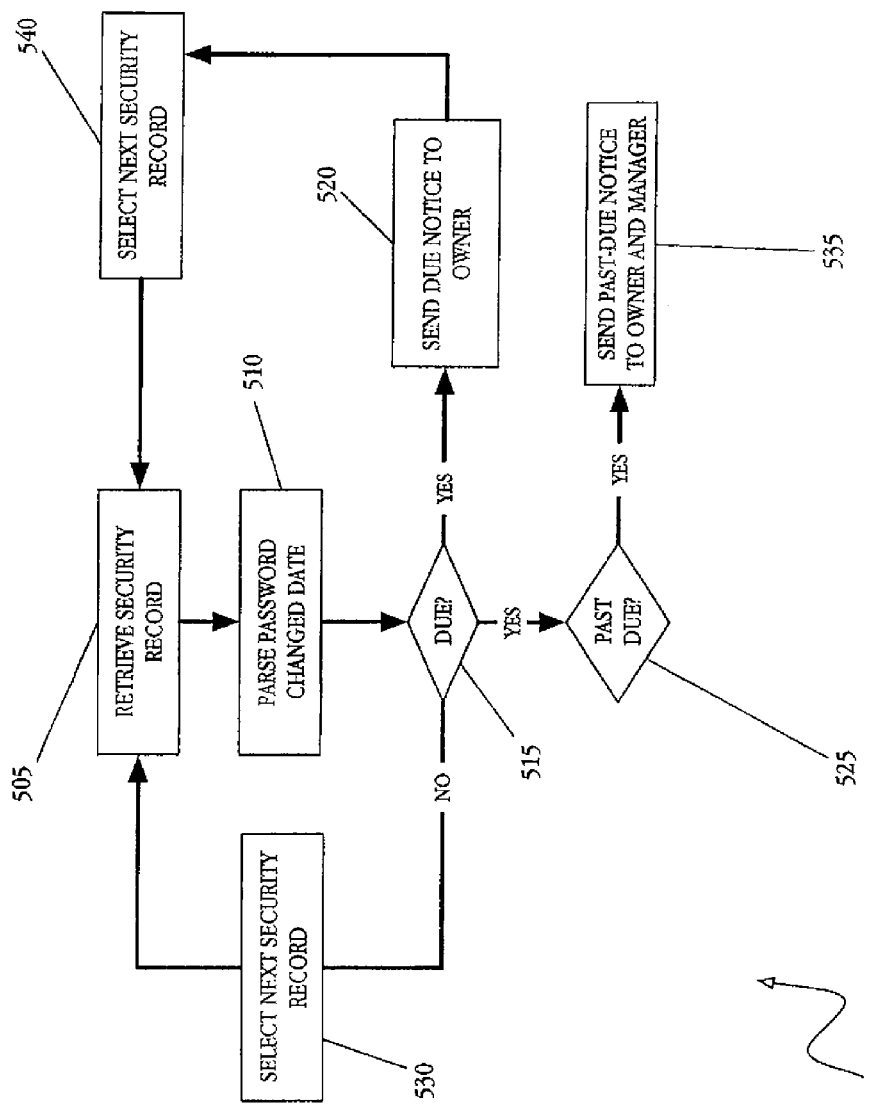
FIG. 5 is a flowchart illustrating a method of maintaining a security setting for a software application, in accordance with an example embodiment.

FIG. 5 is a flowchart illustrating of a method maintaining a security setting for a software application, in accordance with an example embodiment. In an embodiment, the method 500 is performed by a service account management system, such as system 314, as described above and illustrated in FIG. 3. In an embodiment, method 500 is used to periodically determine passwords that are due and past-due for changing by an owner of the service account. In some embodiments, method 500 is a portion of a sequence of operations for all or some of the service account security records maintained by a service account management system.

At block 505, a service account security record is retrieved from the service account security record data store. In some embodiments, a module such as retrieval module 332 is used to retrieve the security record from the security record data store. In some embodiments, the security record includes at least a password maintenance date information for a service account and identification of the service account owner. In some embodiments, the security record includes a user identifier such as user name, user contact information, and a service account identifier. In some embodiments, the service account identifier serves as a key to retrieve user information from a second data store.

At block 510, the password changed date is parsed from the security record using any suitable method. In some embodiments, the changed date reflects the last time the service account owner informed, or otherwise indicated to the service account management system that the password was changed. In some embodiments, the changed date indicated the last time the service account management system reflected the password was changed.

At block 515, the service account management system determines whether the password is scheduled for change. The password due date may be derived by operation on a password date changed field containing in combination with periodicity information. In some embodiments, the password date changed field and periodicity information are contained within each service account security record. In some embodiments, the password date changed field and periodicity information are globally set values that can be obtained without accessing a service account security record. Periodicity information can denote that a password requires changing every set time period, for example, a time period of minutes, hours, days, weeks, months, and years. Here, a password last set on Jan. 6, 2006 having a yearly periodicity would need to be changed on Jan. 7, 2007. The determination that a password is due for changing may be by simple comparison with the present date, or additional logic may be applied. For example, a service account owner can receive notification of a pending required change within a time period prior to the password change date. A 90 day notice, for example, is issued on Oct. 9, 2006 for a password due for changing no later than Jan. 6, 2006.

At block 520, a message is sent to the owner of the service account alerting of the pending need to change the associated password if the current date determined at block 515 is greater the notification date that a password change is pending. The next security record is identified at block 540 and the operation proceeds to block 505.

At block 525, the password change date at block is checked for being past due. At block 535 a message is sent to the security auditor responsible for the service account if the password date is determined to be past due for changing. Accordingly, each past due notice sent to a security auditor at block 535 results in a corresponding notice sent to the owner at block 520. The security auditor and the owner of a service account can enforce the password maintenance schedule by changing the password.

At block 530, if the password is not due for changing, then the next security record is selected and the operation continues at block 505, and the next service account security record is retrieved for processing. As described, retrieval of a security record can be initiated by a user or an owner of a service account, or by an automated process. The process is repeated until all security records indicate the password has changed.

In some embodiments, the due date for password change is a date contained within the service account security record, in which case the due date is parsed from the service account security record along with the password change data at block 510.

Example Implementations

Figure 6:
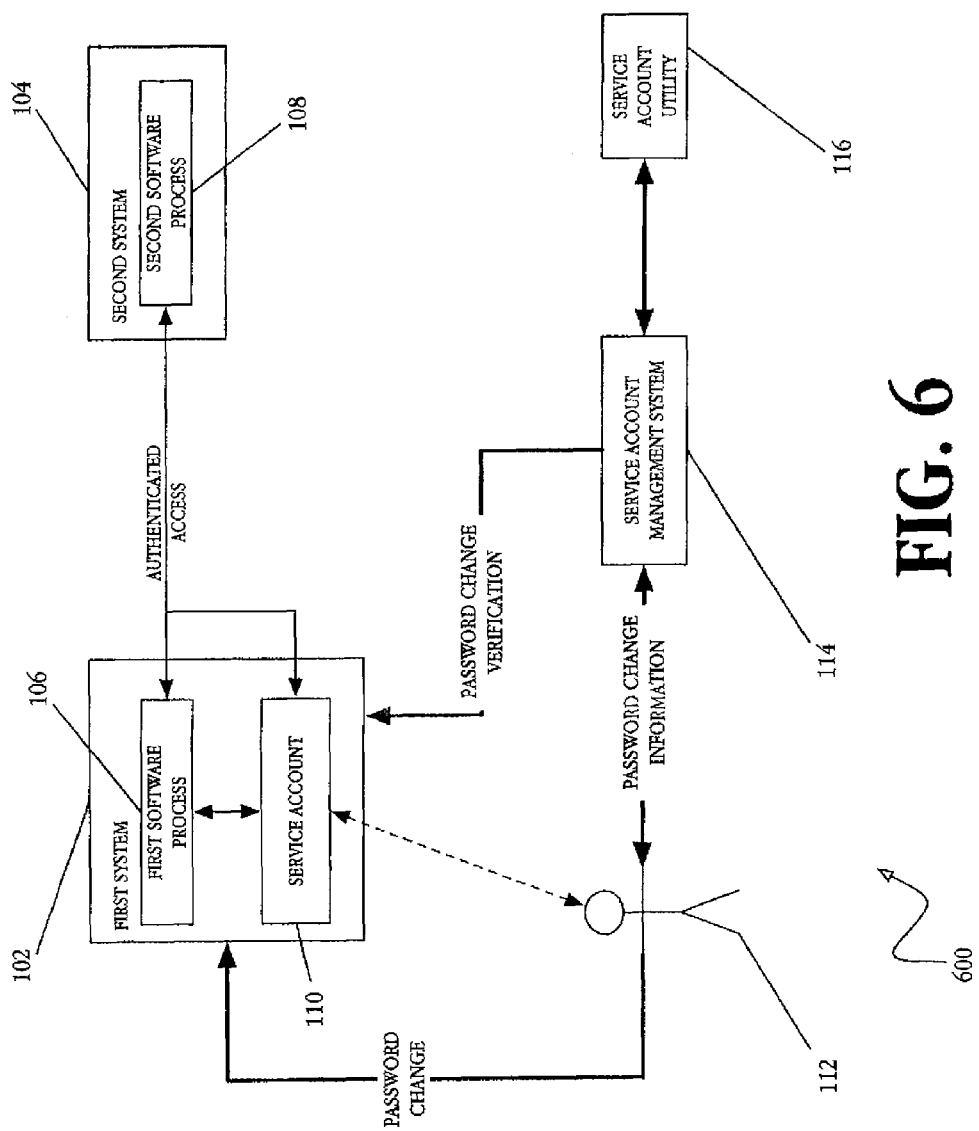
FIG. 6 is a block diagram illustrating a system for providing software application security management, in accordance with an example embodiment.

FIG. 6 is a block diagram illustrating a system for providing software application security management, in accordance with an example embodiment. The example provided represents only one possible arrangement and is presented to further illustrate the apparatus and methods thus far described.

System 600 includes a user 112 managing the service account security records for one or more service accounts 110 located in first system 102. Each service account 110 can be used to authenticate access to an associated process on a second system 104 requiring password authentication. In some embodiments, service account management system 114 is a system including a service account utility, such as system 314. In some embodiments, a service account utility includes policy administrator tool, such as described above. In some embodiments, service account 110 is configured to launch software process 106 on first system 102. In some embodiments, software process 106 is an operating system. In some embodiments, service account 110 causes a software process 106 on first system 102 to access data, or to initiate a process 108, on second system 104. Here, the password is retained within the account database of the first system 102. In some embodiments, the password is retained in a way similar to the way a desktop computer system maintains a database of user account information. Service account 110 can be a managed service account or a non-managed service account. For each type of service account, the user changes the password by direct interaction with the system on which the service account resides. However, managed and non-managed service account security are performed differently. The password of non-managed service account is used to authenticate processes associated with system 102 and system 104 directly. User 112 maintains security records through the service account management system 114 that tracks the status of passwords, but which maintains no password information. When user 112 changes a password of a non-managed service account, the user interacts directly with the system 102 hosting the service account 110. The user also logs onto the service account management system 114 noting in the service account security record that the password was changed. Service account management system 114 subsequently query's host system 102 for the last password change date for that service account. The password change date provided by host system 102 is compared with the user provided date to verify the password was appropriately changed.

In some embodiments, a service account utility 116 is coupled to the service account management system 114. Service account utility 116 includes a service account application for interacting with service account 110, as described above. In some embodiments, the service account utility 116 is coupled to service account management system 114 and a middleware application. In an embodiment, service account utility 116 includes a password data store for managed service accounts. The password data store includes a plurality of records containing a service account identifier and an alias. In a further embodiment, the record may additionally include a destination process identifier. In another embodiment, the service account utility 116 is coupled to a policy administrator tool. In another embodiment, the service account utility 116 contains a policy administrator tool.

In an embodiment, user 112 choosing to register a new service account 110 does so by interacting with the service account management system 114 through a service account application resident in the service account utility 116. The security account application is not configured to retain any passwords. In this example, service account management system 114 is coupled to a verification module (not shown). The verification module can be a separate computer system dedicated to verification tasks. In some embodiments, the verification module is located in the structure of the service account management system 114, such as module 338 described above and illustrated in FIG. 3. The verification module can be configured to receive a generated hash of a password hash from a password repository. The generated hash can be stored internal to the verification module or in a security record data store, such as store 336 for processing information related to the associated service account.

Figure 7:
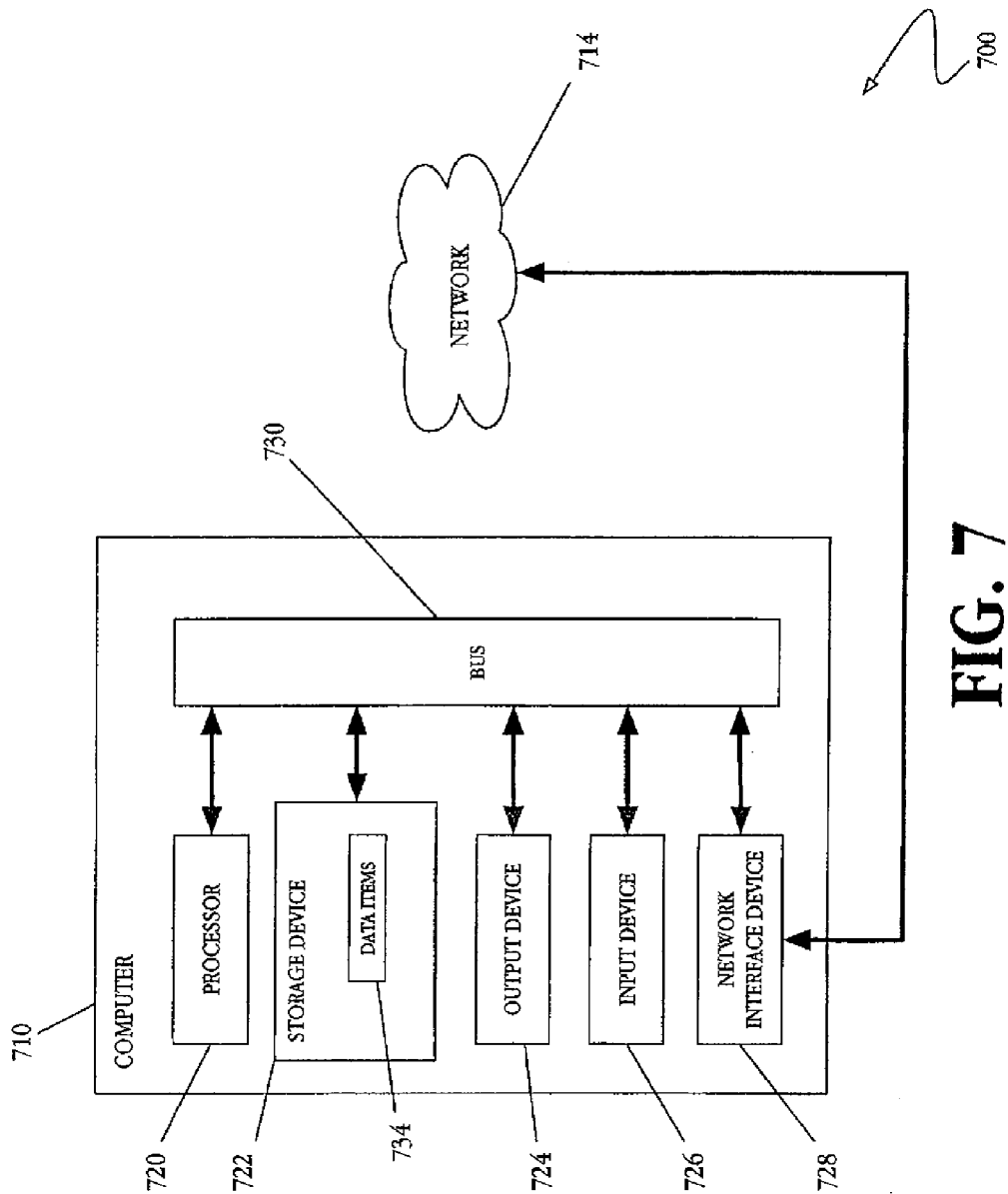
FIG. 7 is a block diagram illustrating a machine including instructions to perform any one or more of the methodologies described herein.

FIG. 7 is a block diagram illustrating machine including instructions to perform any one or more of the methods described herein. System 700 includes a computer 710 connected to a network 714. The computer 710 includes a processor 720, a storage device 722, an output device 724, an input device 726, and a network interface device 728, all connected via a bus 730. Processor 720 represents a central processing unit of any type of architecture, such as a CISC (Complex Instruction Set Computing) processor, RISC (Reduced Instruction Set Computing) processor, VLIW (Very Long Instruction Word) processor, or a hybrid architecture, although any appropriate processor may be used. Processor 720 executes instructions and includes that portion of the computer 710 that controls the operation of the entire computer. Although not depicted in FIG. 7, processor 720 typically includes a control unit that organizes data and program storage in memory and transfers data and other information between the various parts of computer 710. Processor 720 receives input data from input device 726 and network 714 reads and stores code and data in storage device 722 and presents data to output device 724.

Although computer 710 is shown to contain only a single processor 720 and a single bus 730, the disclosed embodiment applies equally to computers that have multiple processors and to computers that may have multiple busses with some or all performing different functions in different ways.

Storage device 722 represents one or more mechanisms for storing data. For example, storage device 722 may include read-only memory (ROM), random access memory (RAM), magnetic disk storage media, optical storage media, flash memory devices, and/or other machine-readable media. In other embodiments, any appropriate type of storage device may be used. Although only one storage device 722 is shown, multiple storage devices and multiple types of storage devices may be present. Further, although computer 710 is drawn to contain storage device 722, it may be distributed across other computers, for example on a server.

Storage device 722 includes a controller (not shown in FIG. 7) and data items 734. The controller includes instructions capable of being executed on processor 720 to carry out the functions, as previously described above with reference to FIGS. 1-6. In another embodiment, some or all of the functions are carried out via hardware in lieu of a processor-based system. In one embodiment, the controller is a web browser. In other embodiments, the controller may be a database system, a file system, an electronic mail system, a media manager, an image manager, or may include any other functions capable of accessing data items. Storage device 722 may also contain additional software and data (not shown), which is not necessary to understand the invention.

Although the controller and data items 734 are shown to be within storage device 722 in computer 710, some or all of data items 734 may be distributed across other systems, for example on a server and accessed via network 714.

Output device 724 is that part of the computer 710 that displays output to the user. Output device 724 may be a liquid crystal display (LCD) well-known in the art of computer hardware. In other embodiments output device 724 is replaced with a gas or plasma-based flat-panel display or a traditional cathode-ray tube (CRT) display. In still other embodiments, any appropriate display device is used. Although only one output device 724 is shown, in other embodiments any number of output devices of different types, or of the same type, may be present. In an embodiment, output device 724 displays a user interface.

Input device 726 may be a keyboard, mouse or other pointing device, trackball, touchpad, touch screen, keypad, microphone, voice recognition device, or any other appropriate mechanism for the user to input data to computer 710 and manipulate the user interface previously discussed. Although only one input device 726 is shown, in another embodiment any number and type of input devices may be present.

Network interface device 728 provides connectivity from computer 710 to network 714 through any suitable communications protocol. The network interface device 728 sends and receives data items from network 714.

Bus 730 may represent one or more busses, e.g., USB (Universal Serial Bus), PCI, ISA (Industry Standard Architecture), X-Bus, EISA (Extended Industry Standard Architecture), or any other appropriate bus and/or bridge (also called a bus controller).

Computer 710 may be implemented using any suitable hardware and/or software, such as a personal computer or other electronic computing device. Portable computers, laptop or notebook computers, PDAs (Personal Digital Assistants), pocket computers, appliances, telephones, and mainframe computers are examples of other possible configurations of computer 710. For example, other peripheral devices such as audio adapters or chip programming devices, such as EPROM (Erasable Programmable Read-Only Memory) programming devices may be used in addition to, or in place of, the hardware already depicted.

Network 714 can be any suitable network and may support any appropriate protocol suitable for communication with computer 710. In an embodiment, network 714 supports wireless communications. In another embodiment, network 714 supports hard-wired communications, such as a telephone line or cable. In another embodiment, network 714 supports the Ethernet IEEE (Institute of Electrical and Electronics Engineers) 802.3x specification. In another embodiment, network 714 is the Internet and may support IP (Internet Protocol). In another embodiment, network 714 is a local area network (LAN) or a wide area network (WAN). In another embodiment, network 714 is a hotspot service provider network. In another embodiment, network 714 is an intranet. In another embodiment, network 714 is a GPRS (General Packet Radio Service) network. In another embodiment, network 714 is any appropriate cellular data network or cell-based radio network technology. In another embodiment, network 714 is an IEEE 802.11 wireless network. In still another embodiment, network 714 is any suitable network or combination of networks. Although one network 714 is shown, in other embodiments any number of networks (of the same or different types) may be present.

The embodiments described herein may be implemented in an operating environment comprising software installed on any programmable device, in hardware, or in a combination of software and hardware. Embodiments may be combined, other embodiments may be utilized, or structural, logical and electrical changes may be made without departing from the scope of the present invention.

This has been a detailed description of some exemplary embodiments of the invention(s) contained within the disclosed subject matter. Such invention(s) may be referred to, individually and/or collectively, herein by the term "invention" merely for convenience and without intending to limit the scope of this application to any single invention or inventive concept if more than one is in fact disclosed. The detailed description refers to the accompanying drawings that form a part hereof and which shows by way of illustration, but not of limitation, some specific embodiments of the invention, including a preferred embodiment. These embodiments are described in sufficient detail to enable those of ordinary skill in the art to understand and implement the inventive subject matter. Other embodiments may be utilized and changes may be made without departing from the scope of the inventive subject matter. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus, each claim stands on its own as a separate preferred embodiment.

It is emphasized that the Abstract is provided to comply with 36 C.F.R. §1.62(b) requiring an Abstract that will allow the reader to quickly ascertain the nature and gist of the technical disclosure. It is submitted with the understanding that it will not be used to interpret or limit the scope or meaning of the claims.

What is claimed is:

1. An apparatus for security management, comprising:
a subsystem including a service account including access information associated therewith; and a service account management system configured to assess a risk for the service account, wherein the risk includes an operational risk level and a security risk level, the service account management system comprising:
  a service account utility configured to include service account application code to communicate with the service account and to register a password change date associated with the access information;
  a security record data store configured to retain a security record, the security record including an identifier associated with the service account and the password change date and configured to provide retrieval information associated with user and owner contact information; and
  a notification module comprising software configured to periodically check the security record for updated information and compliance with a risk-based security policy, and notify a user of the service account when the security record needs to be updated to comply with the security policy.

2. The apparatus of claim 1, wherein the service account management system is configured to provide audit information associated with the password change date.

3. The apparatus of claim 1, wherein the service account is coupled to a module including process code through a middleware application manager.

4. The apparatus of claim 1, wherein the service account management system is configured to track the password change date using the service account utility.

5. The apparatus of claim 1, wherein the service account utility is configured to process the password change date to generate another password change date.

6. The apparatus of claim 1, wherein the service account management system assesses a security level for the service account, the security level based on a combination of a security risk level and an operational risk level.

7. A non-transitory machine-readable medium comprising machine-readable instructions that are executed by a processor to perform a security management method, comprising:
  associating, via a service account management system, a service account module with an adjustable timestamp;
  assessing, via the service account management system, a risk for the service account module, wherein the risk includes an operational risk level and a security risk level;
  wherein the service account module includes access information; and
  wherein the service account management system includes:
    a service account utility configured to include service account application code to communicate with the service account module and to register a password change date associated with the access information;
    a security record data store configured to retain a security record, the security record including an identifier associated with the service account module and the password change date and configured to provide retrieval information associated with user and owner contact information; and
    a notification module configured to periodically check the security record for updated information and compliance with a risk-based security policy, and notify a user of the service account module when the security record needs to be updated to comply with the security policy.

8. The machine-readable medium of claim 7, wherein the security management method includes assessing, via the service account management system, a security level for the service account, the security level based on a combination of a security risk level and an operational risk level.

9. The machine-readable medium of claim 7, wherein the service account module is coupled to another module including process code through a middleware application manager.

10. The machine-readable medium of claim 7, wherein the service account management system is configured to track the password change date using the service account utility.

11. The machine-readable medium of claim 7, wherein the service account utility is configured to process the password change date to generate another password change date.

12. The machine-readable medium of claim 7, wherein the service account management system is configured to provide notification of a pending password change date to a user.

13. A system for message delivery, the system comprising:
a processor; a storage device having instructions contained therein which are executed by the processor to:
  use a service account management system to associate a service account module with an adjustable timestamp and assess a risk for the service account module, wherein the risk includes an operational risk level and a security risk level;
  wherein the service account module includes access information; and
  wherein the service account management system includes:
    a service account utility configured to include service account application code to communicate with the service account module and to register a password change date associated with the access information;
    a security record data store configured to retain a security record, the security record including an identifier associated with the service account module and the password change date and configured to provide retrieval information associated with user and owner contact information; and
    a notification module comprising software configured to periodically check the security record for updated information and compliance with a risk-based security policy, and notify a user of the service account module when the security record needs to be updated to comply with the security policy.

14. The system of claim 13, wherein the service account management system is configured to provide audit information associated with the password change date.

15. The system of claim 13, wherein the service account module is coupled to another module including process code through a middleware application manager.

16. The system of claim 13, wherein the service account management system is configured to track the password change date using the service account utility.

17. The system of claim 13, wherein the service account utility is configured to process the password change date to generate another password change date.

18. The system of claim 13, wherein the service account management system is configured to provide notification of a pending password change date to a user.

19. The system of claim 13, wherein a password maintenance schedule is generated based on the security policy.

20. The system of claim 13, wherein the service account management system assesses a security level for the service account, the security level based on a combination of a security risk level and an operational risk level.

* * * * *